United States Patent
Larzabal et al.

(10) Patent No.: US 8,160,237 B2
(45) Date of Patent: Apr. 17, 2012

(54) MULTI-STAGE DIFFERENTIAL WARPING AMPLIFIER AND METHOD

(75) Inventors: Luis R. A. Larzabal, Mountain View, CA (US); Edward P. Ponganis, Modesto, CA (US); David F. Fraser, Sunnyvale, CA (US)

(73) Assignee: Actelis Networks, Inc., Fremont, CA (US)

( * ) Notice: Subject to any disclaimer, the term of this patent is extended or adjusted under 35 U.S.C. 154(b) by 1163 days.

(21) Appl. No.: 11/707,304

(22) Filed: Feb. 16, 2007

(65) Prior Publication Data

US 2007/0140469 A1    Jun. 21, 2007

Related U.S. Application Data

(63) Continuation-in-part of application No. 11/316,781, filed on Dec. 23, 2005, now Pat. No. 7,587,042, which is a continuation-in-part of application No. 10/889,090, filed on Jul. 12, 2004, now Pat. No. 7,110,528.

(51) Int. Cl.
  *H04M 9/00* (2006.01)
  *H04M 7/04* (2006.01)
(52) U.S. Cl. ........................... 379/398; 379/394
(58) Field of Classification Search .......... 330/304, 330/252; 379/394, 398
  See application file for complete search history.

(56) References Cited

U.S. PATENT DOCUMENTS

| | | | |
|---|---|---|---|
| 2,725,532 A | 11/1955 | Radcliffe, Jr. | |
| 4,331,842 A | 5/1982 | Kiko | |
| 5,678,198 A | 10/1997 | Lemson | |
| 6,011,435 A * | 1/2000 | Takeyabu et al. | 330/252 |
| 6,020,788 A | 2/2000 | Comeau | |
| 6,208,732 B1 | 3/2001 | Moschytz et al. | |
| 6,370,245 B1 | 4/2002 | White | |
| 6,459,684 B1 | 10/2002 | Conroy et al. | |
| 6,507,606 B2 | 1/2003 | Shenoi et al. | |
| 6,798,769 B1 | 9/2004 | Farmwald | |
| 6,829,292 B1 | 12/2004 | Shenoi | |
| 6,838,943 B2 * | 1/2005 | Zamir et al. | 330/304 |
| 7,378,832 B2 * | 5/2008 | Sutono et al. | 324/76.19 |
| 2002/0031113 A1 | 3/2002 | Dodds et al. | |
| 2002/0106012 A1 | 8/2002 | Norrell et al. | |
| 2002/0106076 A1 | 8/2002 | Norrell et al. | |
| 2002/0171475 A1 | 11/2002 | Picha et al. | |
| 2003/0007632 A1 | 1/2003 | Schoessow | |

* cited by examiner

*Primary Examiner* — Alexander Jamal
(74) *Attorney, Agent, or Firm* — Pearl Cohen Zedek Latzer, LLP

(57) ABSTRACT

A multi-stage differential amplifier and method provides a gain versus frequency warping response characteristic that equalizes a transmission line of a given length to compensate for frequency-dependent attenuation. The warping response characteristic comprises the inverse of the attenuation versus frequency characteristic of the line, and affords a substantially flat system gain response over a predetermined frequency spectrum. The individual amplifier stages employ operational amplifiers, and are designed using SPICE simulations such that the individual responses of the stages are tailored so they combine to provide the required overall warping response to compensate the line.

25 Claims, 11 Drawing Sheets

First Iteration Response

MULTI-STAGE DIFFERENTIAL WARPING AMPLIFIER AND METHOD

CROSS-REFERENCE TO RELATED APPLICATIONS

This application is a continuation-in-part of application Ser. No. 11/316,781, filed Dec. 23, 2005 now U.S. Pat. No. 7,587,042, which is a continuation-in-part of application Ser. No. 10/889,090, filed Jul. 12, 2004 now U.S. Pat. No. 7,110,528, the disclosures of which are incorporated by reference herein.

BACKGROUND OF THE INVENTION

This invention relates generally to signal processing in communications systems to equalize the signal transmission medium and to compensate for frequency-dependent signal impairment, and more particularly to electronics circuits and methods for equalizing and compensating for frequency-dependent signal attenuation and the like.

The signal transmission medium of most communication systems is lossy regardless of whether the transmission medium is a transmission line, an optical fiber, or free space, and will characteristically impose a frequency-dependent degradation on signals carried over the medium. Signal attenuation is generally the most significant contributor to signal impairment, and typically is frequency and distant dependent with greater attenuation at higher frequencies and greater distances. To transmit high-speed, high-bit rate digital signals over a lossy transmission line requires signal processing to overcome signal impairments caused by the transmission lines due to signal attenuation, group delay, crosstalk noise from other signals present on other lines, signal reflections, radio-frequency noise, impulse noise, and the like. Signal attenuation increases with frequency and line length. Therefore, the maximum bandwidth and the maximum achievable data transmission rate both decrease as line length increases. The achievable data rate and bandwidth are also limited by other factors such as group delay, which is a function of frequency, as well as crosstalk and noise. The significance of such factors depends on the type of transmission medium. Unshielded twisted pair, for example, is more susceptible to signal impairment due to external factors such as crosstalk and common mode interference than is, for instance, a coaxial cable. All types of transmission media exhibit signal degradation, and some types are more lossy than others.

Because of the abundance of twisted pair transmission lines, it is desirable to use these transmission lines for transmitting high-speed, high-bit rate digital signals. The lossy characteristics of such transmission lines, however, limit their utility as a transmission medium for this type of high-speed, high-bit rate data signals. It is desirable to compensate for the adverse signal impairment effects on these and other types of transmission lines in order to afford reliable transmission at higher data rates and greater distances than are currently attainable. It is further desirable to effect such compensation with relatively simple, inexpensive and low power consumption electronics. It is to these ends that the present invention is directed.

SUMMARY OF THE INVENTION

The invention addresses the foregoing and other problems by providing electronic circuits and methods for signal warping and transmission line equalization to compensate for frequency-dependent signal impairment caused by the line to afford high-bandwidth, high-speed and high-bit rate analog and digital transmission via lossy transmission lines. In particular, the invention affords warping amplifiers and methods that are low power and low noise, and that may be employed effectively at different locations in a transmission line. Devices in accordance with the invention may be powered directly by the line itself, and formed to have a frequency-dependent response characteristic that closely matches the inverse of a frequency-dependent degradation characteristic of the transmission line in which they are used. The warping amplifier and method of the invention may be used to compensate transmission lines for both analog as well as digital signals, and are effective for many different types of communications systems and environments.

In one aspect, the invention provides a warping amplifier for compensating for frequency-dependent attenuation of a transmission line. The amplifier comprises a first amplifier stage that includes a first pair of operational amplifiers connected as a first differential amplifier having first differential input for receiving signals from the transmission line. The first stage is formed with circuit components that are selected to afford a first gain-frequency response characteristic over a predetermined frequency spectrum that has a predetermined gain at a target frequency within the frequency spectrum, and such that the characteristic approximates an inverse of an attenuation-frequency characteristic of the transmission line over the predetermined frequency spectrum. The warping amplifier further has a second stage comprising a second pair of operational amplifiers connected to form a differential amplifier that has a differential input for receiving outputs from the first differential amplifier, and has circuit components selected to provide a second gain-frequency response characteristic that, when combined with the first gain versus frequency characteristic, results in the overall gain of the warping amplifier that substantially matches the attenuation of the transmission line at the predetermined target frequency. The combined first and second gain-frequency response characteristics provide an overall gain-frequency response of the warping amplifier that substantially compensates for the attenuation of the transmission line over the predetermined frequency spectrum.

In another aspect, the invention provides a method of compensating for frequency-dependent attenuation of a transmission line by differentially amplifying signals from a signal source carried by the transmission line, in which the signals are amplified with a first frequency-dependent gain characteristic that has a peak gain at approximately a predetermined target frequency within a frequency spectrum of interest, and a gain-frequency characteristic that approximates the inverse of the attenuation-frequency characteristics of the transmission line. The first differentially amplified signals are further differentially amplifying using a second frequency-dependent gain characteristic that provides an overall gain at said target frequency that substantially compensates for the attenuation of the transmission line at that frequency, such that the first and second frequency-dependent gain characteristics combine to produce an overall gain-frequency response characteristic that substantially compensates for the attenuation of the transmission line over the frequency spectrum of interest.

In still another aspect, the invention affords a method of forming an amplifier to compensate for frequency-dependent attenuation of a transmission line, where the amplifier has a first pair of operational amplifiers of a pre-selected type that are connected as a differential amplifier with resistive and capacitive circuit components that determine the gain-frequency characteristic of the differential amplifier. The method first calculates resistive and capacitive values to afford a target gain at a target peak frequency. A first simulated frequency response characteristic of the differential amplifier is then obtained using a simulation model for the pre-selected operational amplifier type and the calculated circuit component values. The difference between the peak frequency of the simulated frequency response and the target peak frequency is determined, and the value of the capacitive component is adjusted to move the simulated peak frequency toward the target peak frequency. The simulating, determining and adjusting steps are repeated until the simulated peak frequency corresponds substantially to the target peak frequency. The resistive component is then adjusted until the simulated gain at the target peak frequency corresponds to the target gain, and so that an inverse of the gain-frequency response of the amplifier corresponds to the attenuation-frequency characteristic of the transmission line.

In yet another aspect, the invention affords a method of compensating for frequency-dependent attenuation of a transmission line in which signals carried on said transmission line are first warped to compensate for a substantial portion of the attenuation over a predetermined frequency spectrum; and then further warped to refine the first warping to substantially compensate for a remaining portion of the attenuation over the frequency spectrum.

Other more specific aspects of the invention will be provided in the description which follows.

DESCRIPTION OF THE PREFERRED EMBODIMENTS

The invention is particularly well adapted for use in compensating for frequency-dependent impairment of high bit rate digital signals on transmission lines such as a twisted pair, for example, and will be described in that context. It will be appreciated, however, that this is illustrative of only one utility of the invention, and that the invention is applicable to other types of transmission lines, including shielded or unshielded conductors, coaxial cable, etc., as well as to the equalization and compensation of frequency-dependent impairments to electrical signals more generally, as well as to other types of communications systems and transmission media.

For many types of transmission lines, attenuation is the most significant impairment imposed by the transmission lines on signal transmission. For shielded or unshielded twisted pair, for example, crosstalk and common mode noise may also be pronounced signal impairment factors. Because signal attenuation increases rapidly with distance and frequency, it is the primary limitation on the ability of transmission lines to carry high speed digital data. In order to reduce the effects of such factors, the invention affords techniques for equalizing a transmission line to compensate for such effects.

Figure 1:
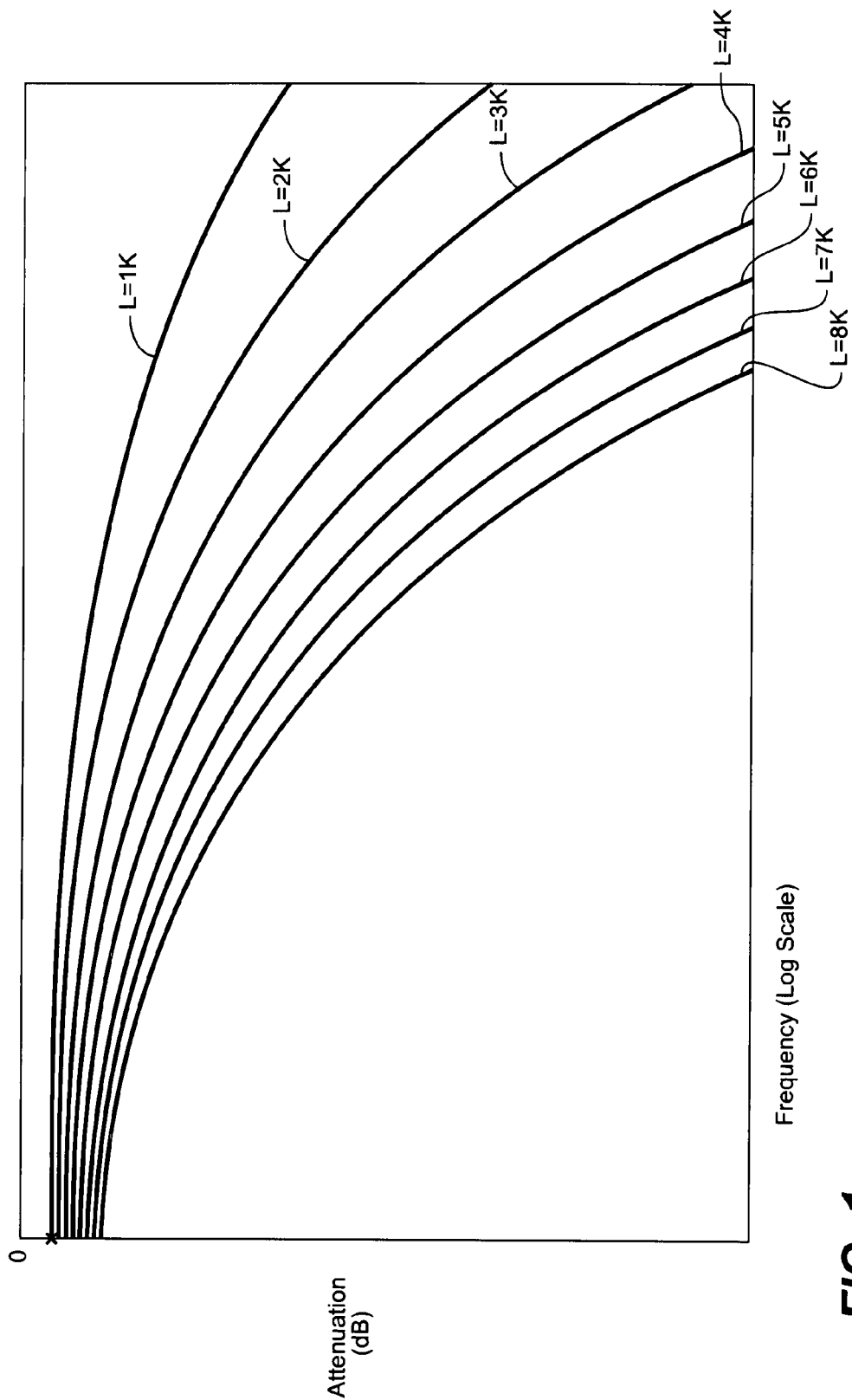
FIG. 1 is a set of curves that illustrate the attenuation characteristic of a transmission line as a function of frequency for different lengths of the transmission line.

FIG. 1 is a family of curves which illustrate the attenuation versus frequency characteristics of transmission lines of different lengths, L, between 1,000 units of length, such as feet, (L=1K) and 8,000 units of length (L=8K). As shown in the figure, the line attenuation increases rapidly with both distance and frequency. For a transmission line of a given length, this frequency-dependent attenuation causes substantial signal degradation, particularly to digital signals, and impairs the ability to use the line for transmission of high speed digital signals over any substantial distance. In order to overcome the effects of this frequency-dependent attenuation, the line may be equalized to compensate for such effects with signal amplification to overcome the attenuation. In particular, to compensate a line for the frequency-dependent effects of attenuation over a frequency spectrum of interest, a gain versus frequency response characteristic that is substantially the inverse compliment of the attenuation versus frequency characteristic of the line may be employed. This provides a signal magnitude that is substantially constant over the frequency spectrum of interest. Additionally, to compensate for the DC portion of the attenuation of the line, sufficient DC gain should be provided so that in addition to compensating for the frequency varying component of attenuation, the constant or DC component is also compensated. This compensates for the total attenuation up to the maximum frequency of interest, $f_{max}$.

Figure 2:
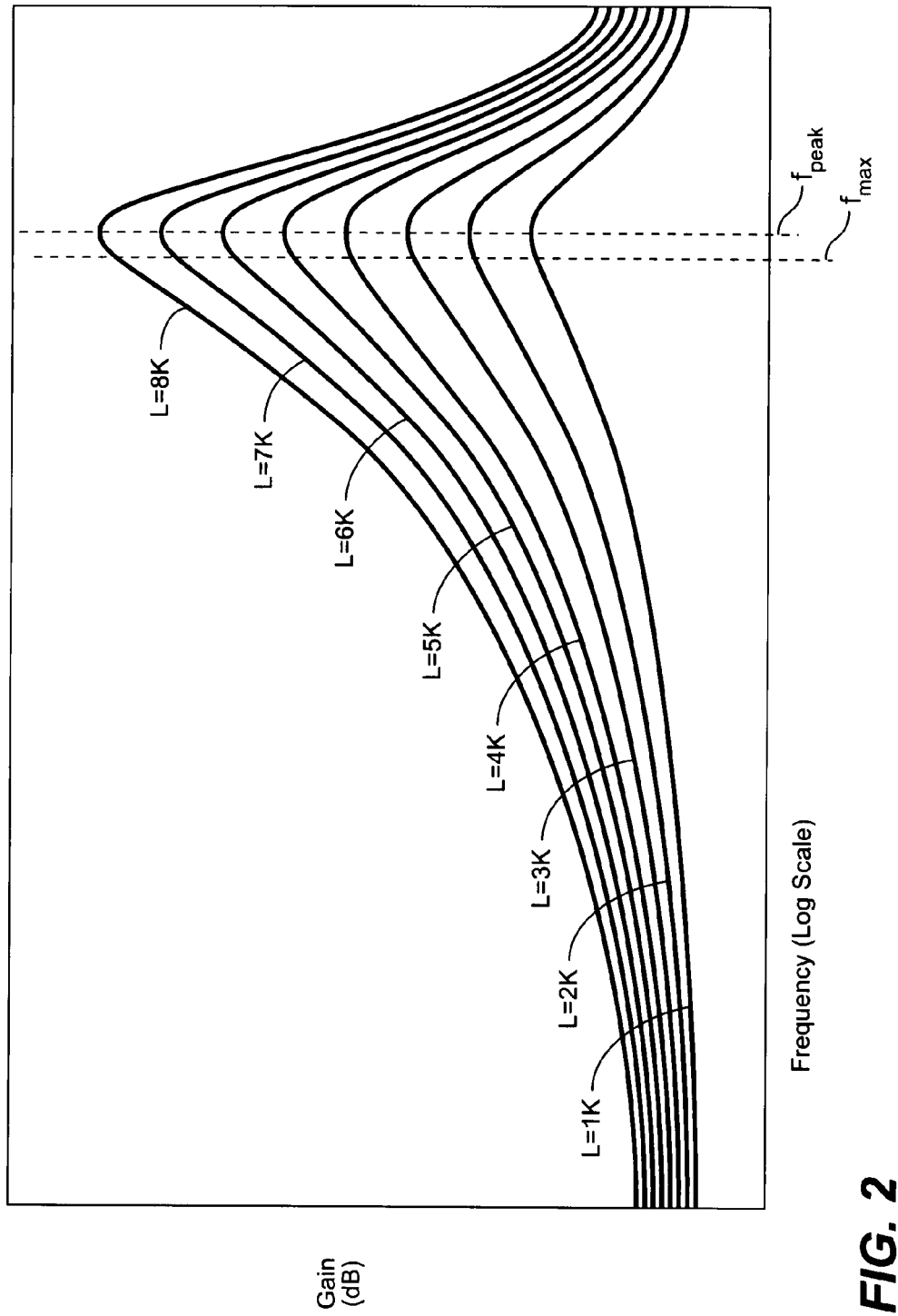
FIG. 2 is a set of curves that illustrate the gain versus frequency characteristics over a given frequency spectrum having a maximum frequency $f_{max}$ for various transmission line lengths to compensate for the attenuation shown in FIG. 1 over the frequency spectrum.

FIG. 2 illustrates a family of gain versus frequency response characteristic curves that are the inverse compliment of the attenuation versus frequency response curves of FIG. 1. These inverse characteristics may be employed to equalize the transmission line and to compensate for the attenuation loss over the frequency spectrum of interest. The various response curves illustrated in FIG. 2 are for line lengths that correspond to the transmission line lengths shown in FIG. 1, and illustrate the shape of the equalization characteristic necessary to equalize each transmission line over the frequency spectrum of interest up to a predetermined maximum frequency, $f_{max}$. Each gain versus frequency response curve illustrated in FIG. 2 is the inverse of the corresponding attenuation versus frequency characteristic curve for the transmission line of the same length as shown in FIG. 1. The gain at the maximum frequency shown in FIG. 2 corresponds to the attenuation loss of the corresponding transmission line at the same frequency.

The invention affords warping amplifiers and methods that provide a gain versus frequency response characteristic that may be tailored to match the attenuation characteristic of a transmission line, to overcome the attenuation loss of the line over the frequency spectrum of interest. As used herein, the term "warping" is used to refer to a frequency-dependent response that has a predetermined variation in shape and magnitude over a frequency spectrum of interest. In particular, the term "warping amplifier" refers to an amplifier having a gain-frequency response characteristic that corresponds to the inverse of a predetermined attenuation-frequency response characteristic of a transmission line, such that when the amplifier is employed in the transmission line, it equalizes the line and compensates for the line loss.

As will be described, the invention affords warping amplifiers and methods having frequency-dependent characteristics that exhibit increasing amplification (gain) with frequency, and have a gain versus frequency response corresponding to the inverse of the frequency dependent attenuation, as shown in FIG. 2, of the transmission line in which the amplifiers and methods are employed. This approach of the invention is advantageous for several reasons. Although the effects of attenuation could be overcome using, for instance, a broadband amplifier having a substantially flat gain versus frequency response, the overall system response would not be flat. In order to adequately compensate for the loss at high frequencies, the lower frequencies would be highly overly amplified, and the gain characteristic would decrease with frequency from a high level at low frequencies to a lower level at higher frequencies. Among other disadvantages, this would limit the dynamic range of the amplifier, likely cause significant signal degradation, particularly for digital signals, and result in high amplifier power consumption. This latter factor would be especially disadvantageous because the need to supply operating power to an amplifier would limit the ability to locate the amplifier at an intermediate location in a transmission line. The invention, by using a warping characteristic that matches the inverse of the frequency-dependent attenuation characteristic, permits the use of small, low noise, low power, high gain-bandwidth product devices that can be conveniently located at intermediate locations on long transmission lines, and which can substantially overcome the attenuation caused by the line.

Figure 3:
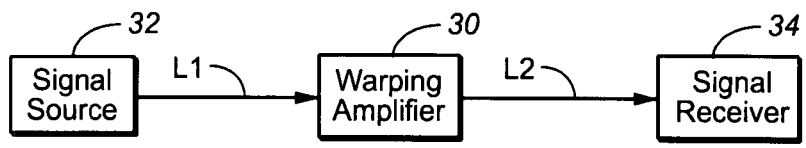
FIG. 3 is a block diagram of a communications system that employs a warping amplifier in accordance with the invention.

FIG. 3 illustrates a communication system in which a warping amplifier 30 in accordance with the invention may be employed. As shown, the communication system may comprise a signal source 32 and a receiver signal 34 connected by a transmission line having a length, L, comprising two segments with lengths L1 and L2, where L=L1+L2. As shown in the figure, the warping amplifier 30 is preferably located at an intermediate position in the transmission line between the signal source and the receiver, although it may be used effectively at other locations as well. This is illustrated by the following relationships which characterize the line and the amplifier.

The frequency and length-dependent attenuation, A(f,L) due to a length L of transmission line can be expressed as:

$$A(f,L)=(A(f))^L, \qquad \text{[Eq. 1]}$$

where A(f) represents the attenuation per unit length of the transmission line as a function of frequency. Compensation for this attenuation may be accomplished using a gain versus frequency response characteristic corresponding to the reciprocal of the attenuation function of Equation 1. The overall system gain, $G_{system}$, is the product of the transmission medium attenuation $A_T$ and the equalization gain $G_{Eq}$:

$$G_{system}=A_T \times G_{Eq}. \qquad \text{[Eq. 2]}$$

Since the desired overall system gain is frequently equal to 1, Equation 2 becomes:

$$G_{Eq}=1/A_T=A(f)^{-L} \qquad \text{[Eq. 3]}$$

Thus, an equalization amplifier having a gain $G_{Eq}$ response given by Equation 3 will compensate for the frequency-dependent attenuation of the transmission medium.

For the system illustrated in FIG. 3, the overall system response is:

$$G_{system}=A_{T1} \times G_{Eq} \times A_{T2}, \qquad \text{[Eq. 4]}$$

where $A_{T1}$ and $A_{T2}$ are, respectively, the attenuations of the transmission line segments L1 and L2. Equation 4 may be rewritten as:

$$G_{system}=A(f)^{L1} \times G_{Eq} \times A(f)^{L2}=A(f)^{L1+L2} \times G_{Eq} \qquad \text{[Eq. 5]}$$

To achieve an overall system gain $G_{system}=1$, the warping amplifier gain is:

$$G_{Eq}=1/A_T=A(f)^{-(L1+L2)}=A(f)^{-L}, \qquad \text{[Eq. 6]}$$

where L=L1+L2 is the overall length of the transmission medium. Equation 6 shows that the theoretically required warping response to compensate for the transmission line is independent of the warping amplifier placement in the line. However, the warping amplifier of the invention is preferably placed at an intermediate location, e.g., at a midpoint, for instance, in the transmission line between the signal source and signal receiver. Under these circumstances, the amplifier post-compensates for the attenuation of the input segment L1 of the line and pre-compensates for the attenuation of the output segment L2. Optimal placement of the warping amplifier in the transmission may be determined based upon a number of different factors, such as those mentioned above. Also, while FIG. 3 shows only one amplifier 30 in the line, it will be appreciated that additional amplifiers may be placed at other locations in the line. Under these circumstances, the overall system gain would be the combined responses of the amplifiers and the line attenuation.

In order to provide the equalization and compensation for frequency-dependent attenuation in a transmission line, the invention preferably employs a multi-stage differential warping amplifier and method. A differential amplifier architecture is particularly advantageous for use on a balanced transmission line, such as a twisted pair line, since a differential amplifier configuration has high common mode rejection and high noise immunity. Using multiple stages of amplification is very advantageous for several reasons. As will be described, this facilitates precisely shaping of the gain versus frequency warping response to match the line attenuation characteristic or that of another communications environment in which it is used, while permitting an amplifier design having the desired bandwidth and current drive capabilities. To achieve high bandwidth, high gain and high drive capability, two or more amplifier stages are preferred because it is difficult using a single stage amplifier to achieve a precisely tailored warping characteristic, while simultaneously satisfying other performance criteria of a practical application.

Moreover, multiple stages afford more flexibility of design, which is advantageous in satisfying multiple, and sometimes conflicting, performance requirements.

In the multi-stage amplifier, the first amplifier stage may be designed to provide the primary warping characteristic required to equalize the line, while the second and any subsequent amplifier stages may refine the gain and warping characteristic of the first stage, as well as providing additional current drive capability required by a particular application, as will be described in more detail below.

Figure 4:
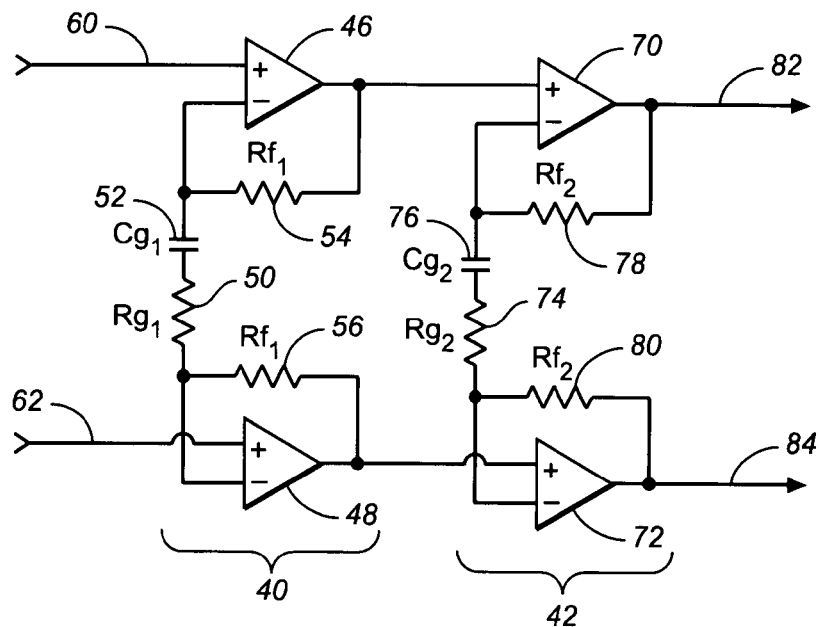
FIG. 4 is an electrical circuit schematic of a two-stage differential warping amplifier in accordance with a first embodiment of the invention.

FIG. 4 is a schematic diagram of a preferred embodiment of a two-stage differential warping amplifier in accordance with the invention. As shown in FIG. 4, each of the two amplifier stages 40, 42 may comprise a differential amplifier having a similar architecture. The initial or input stage 40 of the multi-stage differential warping amplifier may comprise a pair of operational amplifiers ("op amps") 46, 48 having their inverting inputs connected together through an R-C circuit comprising a resistor 50, $Rg_1$, and a capacitor 52, $Cg_1$ connected in series, and having their outputs connected to their inverting inputs through feedback resistors ($Rf_1$,) 54, 56, as shown. As will be described in more detail shortly, the values of the resistive and capacitive circuit components 50-56 of the amplifier stage may be selected to provide a predetermined gain versus frequency characteristic for the stage. Op amps 46, 48 respectively provide inputs 60, 62 to the first stage of the differential amplifier, and signals from signal source 32 (FIG. 3) may be provided as inputs either directly or through intermediate circuitry to the inputs 60, 62 of the first differential amplifier stage.

As shown in FIG. 4, the second stage 42 of the warping amplifier may have the same architecture as the first stage 40. It may comprise a pair of op amps 70, 72 having their inverting inputs connected together through an R-C circuit comprising a resistor 74, $Rg_2$ and a capacitor 76, $Cg_2$, and having their outputs connected to their inverting inputs through feedback resistors ($Rf_2$) 78, 80. The outputs from the op amps 82, 84 comprise the output of the differential multi-stage warping amplifier, and may be connected either directly or indirectly through intermediate circuitry to the transmission line segment L2 to provide signals post-compensated for the effects of transmission line segment L1 and pre-compensated for the effects of transmission line segment L2.

The two op amps of the pair in each stage 40, 42 of the warping amplifier are preferably the same type (model) of op amp. Moreover, it is desirable that the two op amps 46, 48 and 70, 72 of each pair be fabricated together on the same semiconductor substrate and packaged to form a "dual-amplifier" integrated circuit chip. This helps to ensure that the two op amps of a pair have substantially identical characteristics. Still more desirable is that all four op amps of the two pairs in the two-stage amplifier may be fabricated together in the same integrated circuit as a "quad amplifier". Op amps 46, 48 in the input stage 40 are preferably voltage feedback op amps that provide high gain and high warping, while the op amps 70, 72 in the second stage 42 of the warping amplifier may comprise, for example, current feedback op amps that have lower gain and lower warping but higher drive capability. The voltage feedback op amps in the first stage are preferably selected to have a gain-bandwidth product that affords at least a substantial portion of the required gain of the warping amplifier at the maximum frequency of interest without consuming excessive power, whereas the op amps in the second stage may be selected to have lower gain but be configured to provide final shaping of the warping response curve, as will be described, and provide the required current drive capability. For a given amplifier stage, the gain-frequency characteristic of the stage is determined by the values of the resistive and capacitive components Rf, Rg and Cg, as will be described.

Figure 5:
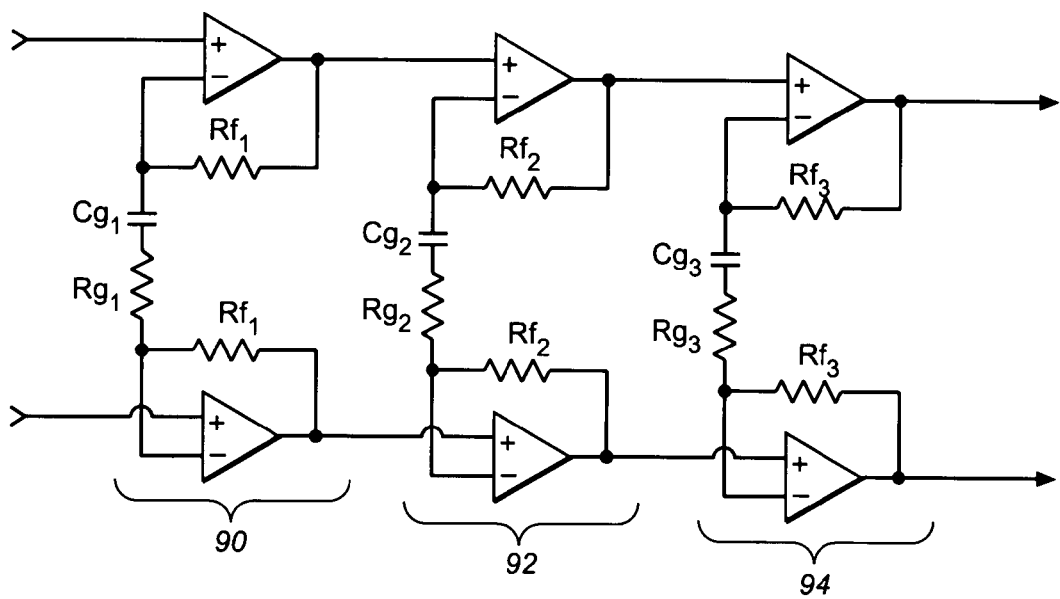
FIG. 5 is an electrical circuit schematic of a three-stage differential warping amplifier in accordance with a second embodiment of the invention.

FIG. 5 illustrates another embodiment of a multi-stage differential warping amplifier in accordance with the invention. As shown, the amplifier of FIG. 5 comprises a three-stage differential warping amplifier, comprising an input stage 90, an intermediate stage 92 and an output stage 94. As with the two-stage amplifier of FIG. 4, each of the three stages 90, 92, 94 may be differential stages having the same architecture as described previously for the stages 40, 42 of the warping amplifier of FIG. 4. Each stage may comprise a pair of operational amplifiers having their inverting inputs connected through a R-C network comprising a resistor $Rg_i$ in series with a capacitor $Cg_i$, and having their outputs connected to their inverting inputs by a feedback resistor $Rf_i$ (where i=1, 2 or 3). As with the amplifier of FIG. 4, the values of the resistive and capacitive components of each stage may be selected to provide a predetermined gain versus frequency response characteristic to the stage. The overall gain versus frequency response of the multi-stage warping amplifier is determined by the combined gain versus frequency responses of the individual stages.

As will be described in more detail below, the first stage 90 of the amplifier of FIG. 5 may comprise voltage feedback op amps, for example, selected to have a high gain-bandwidth product, and the first stage may be designed to provide high gain and high warping. The second intermediate stage 92 of amplifier may also employ voltage feedback op amps, and be designed to have medium gain and medium warping. The final output stage 94 of the amplifier may employ current feedback op amps, and be designed for low gain, low warping and relatively high drive. As with the warping amplifier of FIG. 4, the input stage of the amplifier of FIG. 5 is preferably designed to provide the primary gain versus frequency response characteristic shape and gain of the warping amplifier, while the intermediate and final stages are used to refine and further refine and shape the gain versus frequency response characteristic of the overall warping amplifier, and to provide the required overall gain. The last stage may be designed to provide the primary drive capability. This will be described in more detail later in connection with FIG. 13. However, the manner in which each stage of the differential amplifier may be designed and constructed to achieve a predetermined warping characteristic will first be explained.

Figure 6:
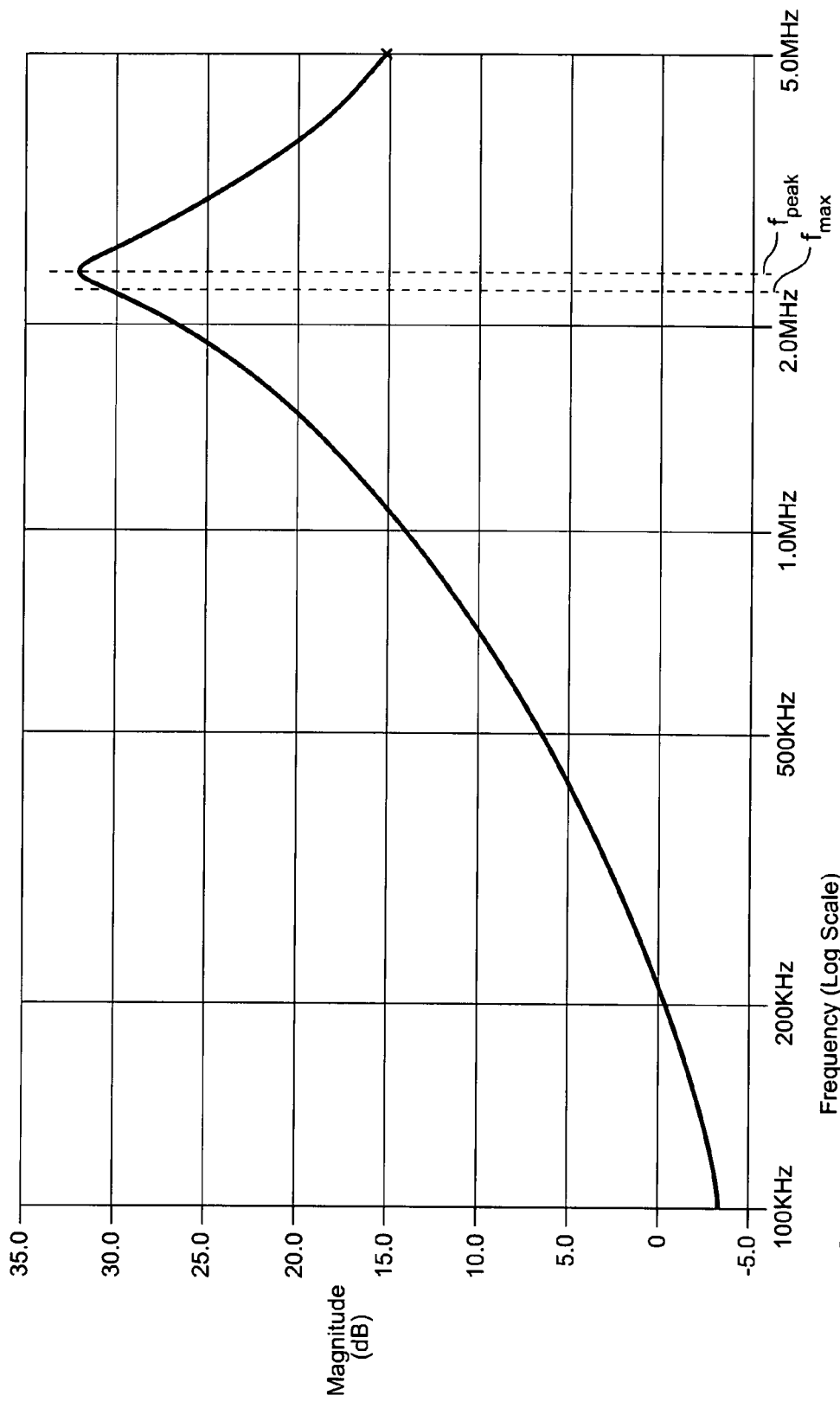
FIG. 6 is a diagramatic view that illustrates an example of a frequency response characteristic for the initial stage of a differential warping amplifier in accordance with the invention.

FIG. 6 illustrates an example of a desired gain-frequency response characteristic for a stage, such as input stage 40, of a warping amplifier in accordance with the invention. The gain characteristic shown may correspond substantially to the inverse of the attenuation response of the transmission line in which the amplifier is used. As shown in the figure, the gain characteristic corresponding to the inverse of the attenuation, as illustrated in FIG. 2, has a generally concave characteristic increasing up to a maximum gain at a peak frequency, $f_{peak}$. Above the peak frequency, the gain falls off. In order to achieve the desired high frequency warping (as illustrated in FIG. 2) to match the frequency dependent attenuation of the transmission line, the second derivative of the amplifier gain with respect to frequency should be positive, i.e., $d^2G/df^2>0$. This implies that the inflection point of the gain response curve, which occurs somewhat below the frequency of the peak gain, $f_{peak}$, should correspond to the maximum frequency, $f_{max}$ of the frequency spectrum of interest. In FIG. 6, the peak frequency for the curve shown occurs at approximately 2.4 MHz, and the maximum frequency, $f_{max}$, occurs at approximately 2.2 MHz.

The "Q" of the amplifier gain response determines the sharpness of the gain peak and the amplification that is applied to the range of frequencies about the peak frequency. As will be described, the value of the R-C network capacitor Cg (capacitor 52, for example, in FIG. 4) determines, in substantial part, the peak frequency, $f_{peak}$, at which the maximum gain occurs, and the value of the R-C network resistor Rg (resistor 50 in FIG. 4) determines, in substantial part, the roll off characteristics of the gain from the peak and the "Q" of the amplifier stage. The actual frequency at which the peak gain occurs is also a function of the inherent characteristics of the op amps employed in the differential amplifier stage. Using SPICE models for the op amps provided by the op amp manufacturers and simulations, the actual values of the resistive and capacitive components required for a particular op amp to provide a desired gain-frequency response characteristic may be determined, as will be described below. Generally, increasing the value of the capacitor Cg will move the peak gain lower in frequency, and, conversely, decreasing the value of this capacitor will increase the frequency of the peak gain. Lowering the value of resistor Rg will increase the "Q" and provide a sharper peak and faster roll off of gain above and below the peak, and, correspondingly, increasing the value of this resistor will flatten the gain characteristic. Once the overall gain versus frequency response characteristic for the warping amplifier is determined for optimum equalization and compensation, the warping characteristics of the individual amplifier stages may be determined.

Figure 7:
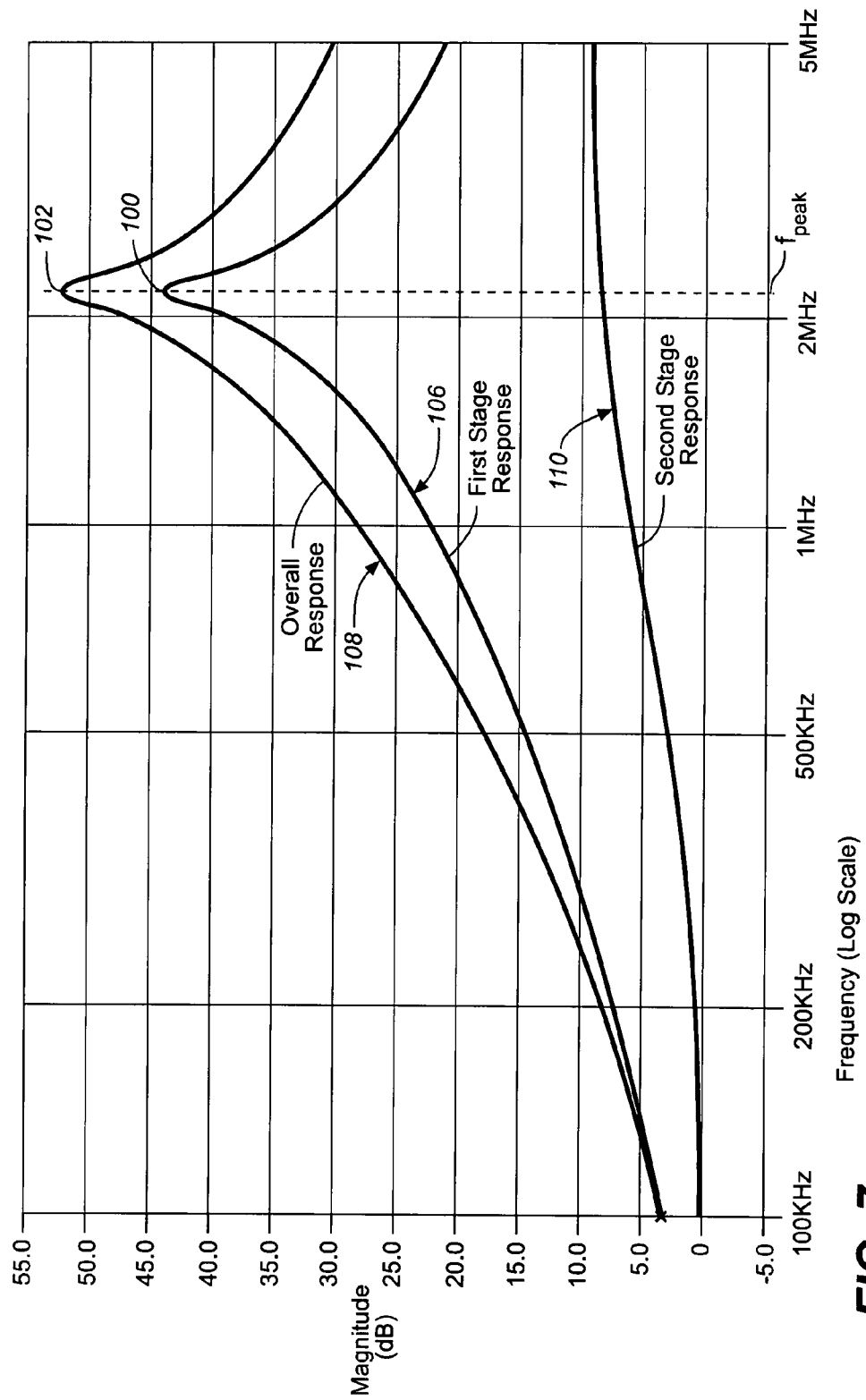
FIG. 7 shows the gain versus frequency response characteristics of the individual stages of a two-stage warping amplifier in accordance with the invention, the figure illustrating how the responses of the stages combine to provide an overall frequency response characteristic.

FIG. 7 illustrates an example of how the gain versus frequency response characteristics of the individual stages of a two-stage differential warping amplifier, such as illustrated in FIG. 4, combine to provide an overall gain versus frequency response characteristic. To achieve the desired overall response shown in the figure, the first stage response may be designed to have a maximum gain 100 that occurs at a frequency corresponding to the peak gain frequency, $f_{peak}$, of the overall desired gain versus frequency response. As shown in the figure, this maximum gain 100 of the first stage may be somewhat below the desired maximum gain 102 of the overall response. It is preferable that the shape of the first stage gain response be similar to the desired overall warping response. This gain may then be tailored precisely to the overall gain value desired using one or more additional amplifier stages. In the example shown in FIG. 7, the shape of the first stage response curve in the region 106 below the peak frequency is more concave than the shape of the overall response characteristic in the corresponding region 108. In other words, the first stage response has a higher "Q" than the overall desired response, but a somewhat lower gain than the maximum gain desired. In order to achieve the overall desired warping response characteristic shape and gain, the second stage may be designed to have a response characteristic that complements the warping response of the first stage such that when combined with the response of the first stage, the desired overall response is obtained. Thus, the second stage may be designed to have a gain response 110 as shown in the figure, where the gain response increases gradually with frequency and is much flatter over the frequency spectrum of interest up to the peak frequency, $f_{peak}$. In fact, the peak response of the second stage may occur at a much higher frequency than the peak frequency, $f_{peak}$, (beyond the highest frequency shown in the figure), and the second stage may have a much lower "Q" than that of the first stage. By appropriately selecting the resistive and capacitive components of the second stage, its frequency-dependent response characteristic can be tailored such that when combined with the frequency-dependent response characteristic of the first stage, the resulting overall response of the amplifier matches the desired overall response shown in the figure. By using multiple stages, the overall gain response characteristic of the amplifier can be tailored to match closely the desired overall warping response characteristic.

The invention affords a method of designing and implementing a differential amplifier stage to provide a predetermined gain versus frequency response characteristic, as will now be described. The starting point for designing a differential amplifier stage may be based upon the following theoretical equations and an assumed idealized op amp. At frequencies, f, below a targeted peak frequency, the gain, Gf, of the amplifier stage is given by:

$$Gf = 20\log(1+(Rf/Zg)), \qquad [\text{Eq. 7a}]$$

and $$Zg = \text{Sqrt}(Rg^2 + Xcg^2) \qquad [\text{Eq. 7b}]$$

where Zg is the impedance of the series circuit comprising Rg and Cg, where the capacitive reactance of Cg is $$Xcg = 1/(2\pi f Cg). \qquad [\text{Eq. 7c}]$$

The above equations may be rewritten in functional notation as:

$$Gf = G(f, Rf, Rg, Cg) \qquad [\text{Eq. 8}]$$

to explicitly show the functional dependence of gain on the passive component values and the frequency.

Equations 7a-7c are theoretical equations based upon ideal components. If the op amps in the amplifier stage were ideal, these equations could be used to solve for the values of the passive components to provide the desired peak frequency, and the desired gain at the peak frequency. Practical op amps, however, are not ideal. They have many limitations, such as gain-bandwidth product, and impedance characteristics that vary widely, and result in very different response characteristics for the same passive circuit components and different op amps. For example, the values of the resistive and capacitive components used in one differential amplifier with one type of op amp may produce a gain-frequency characteristic that is very different from the gain-frequency characteristic resulting from using the same component values with a different type of op amp. Moreover, the gain-frequency response characteristic obtained by changing the values of the resistive and capacitive components while maintaining the ratios and proportionality of the values the same may produce different gain-frequency response characteristics for the same op amp. This dependence of gain on frequency, the particular op amp characteristics and the values of the resistive and capacitive components may be expressed as follows:

$$\text{Gain} = G(f, Rf, Rg, Cg; \text{Op Amp}) \qquad [\text{Eq. 9}]$$

which shows explicitly the dependence of gain on the particular choice of op amp as well as the values of the circuit components.

Because of this dependence of gain on different variables, theoretical designs seldom match the desired characteristics. Accordingly, the invention employs an iterative method for solving for the op amp-dependent passive circuit component values required to achieve a desired frequency response characteristic. The ideal equations may be used to derive initial values for the passive component values, and then certain relationships as set out below may be used to refine and modify these passive values to adjust the peak frequency and the gain at the peak frequency to achieve the desired target characteristics. For equivalent gain and group delay characteristics, the following guidelines and relationships may be used to adjust the warping response:

$$Rf_1/Rg_1 = Rf_2/Rg_2 \quad \text{[Eq. 10a]}$$

$$Rg_1 Cg_1 = Rg_2 Cg_2 \quad \text{[Eq. 10b]}$$

With the ratio Rf/Rg fixed, Cg may be used to control the DC gain, by moving the peak gain of the response characteristic higher and lower in frequency (left and right) on the gain versus frequency response characteristic of FIG. 6, for example. The gain at the peak frequency may be controlled by Rg with Rf and Cg fixed. Changing the value of Rg increases and decreases the gain.

Figure 8:
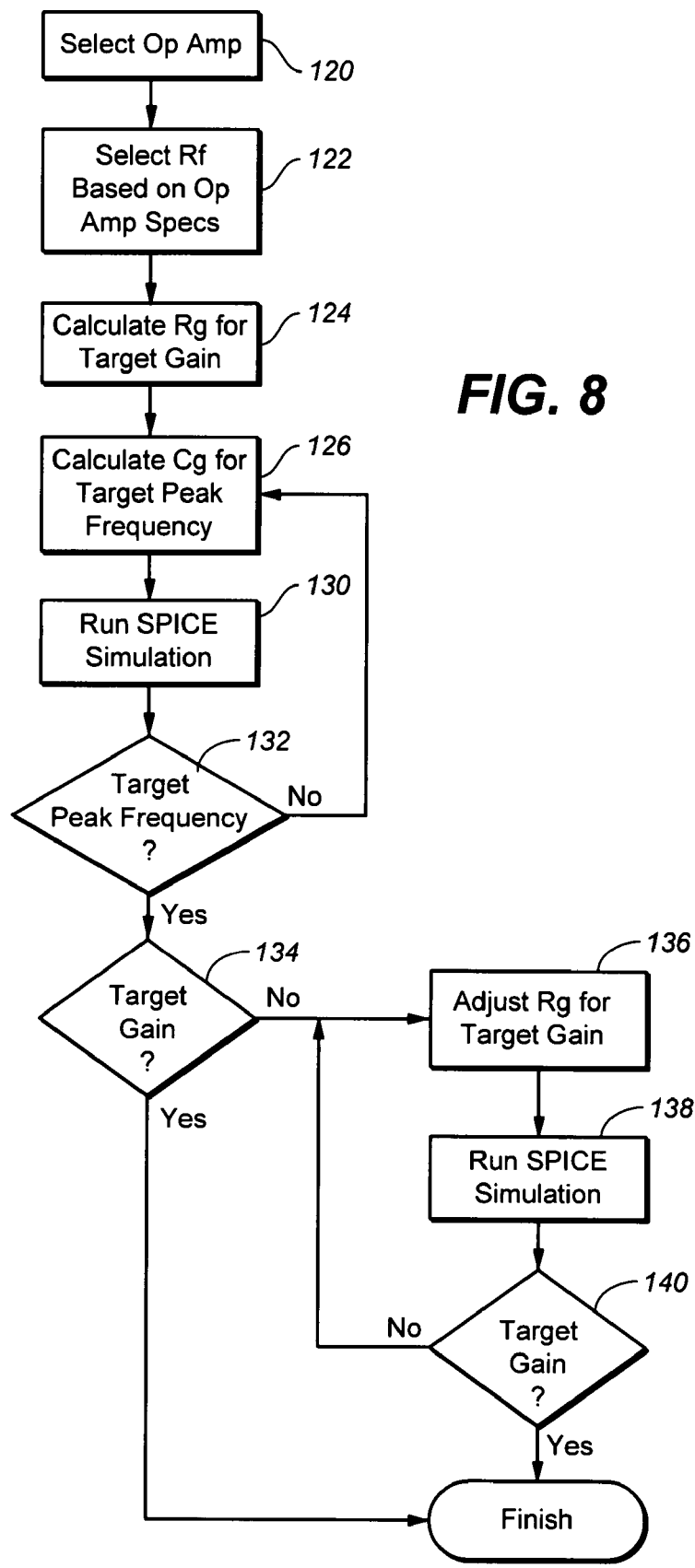
FIG. 8 is a flow chart of an iterative process in accordance with the invention for designing a warping amplifier stage to achieve a predetermined gain versus frequency response.

FIG. 8 is a flow chart that illustrates an iterative process in accordance with the invention which may be employed for designing and implementing a differential warping amplifier stage to have a desired gain versus frequency characteristic. The process begins with the selection at 120 of an op amp which has an appropriate gain-bandwidth product to provide a desired target gain at a target peak frequency. At 122, a feedback resistor Rf may be selected according to the recommended values of the op amp manufacturer's specification and application notes. Next, at 124, using the selected value of Rf, the value for the input resistor Rg may be calculated to afford the desired target gain, Gf, using the following equation:

$$Rg \cong 2Rf/(10^{Gf/20} - 1) \quad \text{[Eq. 11]}$$

At step 126, the value for the input capacitor Cg may be calculated to provide the desired target peak frequency using the following equation:

$$Cg \cong 1/(2\pi f Rg) \quad \text{[Eq. 12]}$$

Operational amplifier manufacturers provide SPICE models for their products that uniquely characterize each particular type of op amp. Using the SPICE model for the particular op amps selected in step 120, and the values of the resistive and capacitive components determined in steps 122-126, a SPICE simulation may be performed at 130 to produce a gain response characteristic over a predetermined frequency spectrum of interest, and the peak frequency at which the maximum gain occurs can be determined from the simulation. If the peak frequency is not located at the desired target peak frequency, at step 132 the process loops back to step 126 where a new value for Cg is determined. If the target peak frequency is lower than the simulated peak frequency, the frequency of the peak may be decreased by increasing the value of the capacitance Cg. On the other hand, if the target peak frequency is higher than the simulated peak frequency, the frequency peak may be increased by decreasing the capacitance value Cg. For moderate changes, the relationship between capacitance and frequency is approximately an inverse square law. Accordingly, to adjust the value of capacitor Cg to move the frequency peak toward the target frequency, the following relationship may be used:

$$Cg_{new} = Cg_{current}/(f_{target}/f_{current})^2 \quad \text{[Eq. 13]}$$

After obtaining the new value for Cg, another SPICE simulation may be run at step 130 with the new value of Cg, and the new peak frequency determined from the simulation. If the peak frequency does not match the desired frequency, the process may be iterated further. If the desired peak frequency cannot be obtained with reasonable circuit parameters and values, the particular op amps selected may be inappropriate. Accordingly, a different op amp may be selected and the process repeated. Op amps with higher frequency responses typically have response curves that peak at higher frequencies, and conversely.

Once the desired peak frequency has been achieved at 132, at step 134 it is determined whether the target gain has been achieved. If not, the process adjusts the value of Rg at step 136 to move the gain value obtained through simulation toward the desired target gain. If the simulated peak gain is lower than the target gain, the gain at the peak may be increased by decreasing the value of the resistance Rg. On the other hand, if the simulated peak gain is higher than that desired, the gain may be decreased by increasing the value of resistor Rg. For moderate changes, the relationship between resistance and gain is approximately an inverse linear law. To adjust the resistor Rg to move the peak gain value towards the target peak gain, the following relationship may be used:

$$Rg_{new} = Rg_{current}/(Gain_{target}/Gain_{current}) \quad \text{[Eq. 14]}$$

Next, at 138, a SPICE simulation may be run using the previously determined values of Rf, Cg and the adjusted value for Rg. At step 140, a determination is made whether the simulated gain corresponds to the target gain. If not, the process may be iterated further by adjusting the value of Rg until the simulated gain equals the desired target gain.

Modifying the value of resistor Rg may cause the frequency at which the peak gain occurs to shift somewhat. This shift should be small. However, if it exceeds a desired design tolerance, the process may be iterated further, a new value of capacitance Cg determined, and the simulation repeated while readjusting Rg if necessary. The described process should rapidly converge to circuit parameters which provide the desired warping amplifier response. If it does not, the selected op amp may be inappropriate. Thus, a different op amp may be selected and the process repeated. Once the desired response is obtained, the final step of the process is to replace the passive component values which were obtained theoretically through simulation with values that are commercially available, and verify by simulation that the resulting response curve meets the desired target values. If necessary, combinations of resistive and capacitive components may be used in series and parallel to achieve the required values.

As an example of using the foregoing process of FIG. 8 to design an amplifier stage, assume that a desired response curve has a target peak gain Gf=40 dB at a target peak frequency $f_{peak}$=2.4 MHz. Using an op amp which has a frequency response commensurate with the design goal, the manufacturer's specification may be used to select a recommended value of Rf equal to, for example, 2490 Ohms. Using Equation 11, $Rg \cong 2Rf/(10^{Gf/20} - 1)$, calculate $$Rg = 2Rf/99 = 2*2490/99 \cong 50 \text{ Ohms,}$$

and using Equation 12, $Cg \cong 1/(2\pi f Rg)$, calculate $$Cg = 1/(2\pi * 2.4 * 10^6 * 50) \cong 1326 \text{ pF}$$

Figure 9:
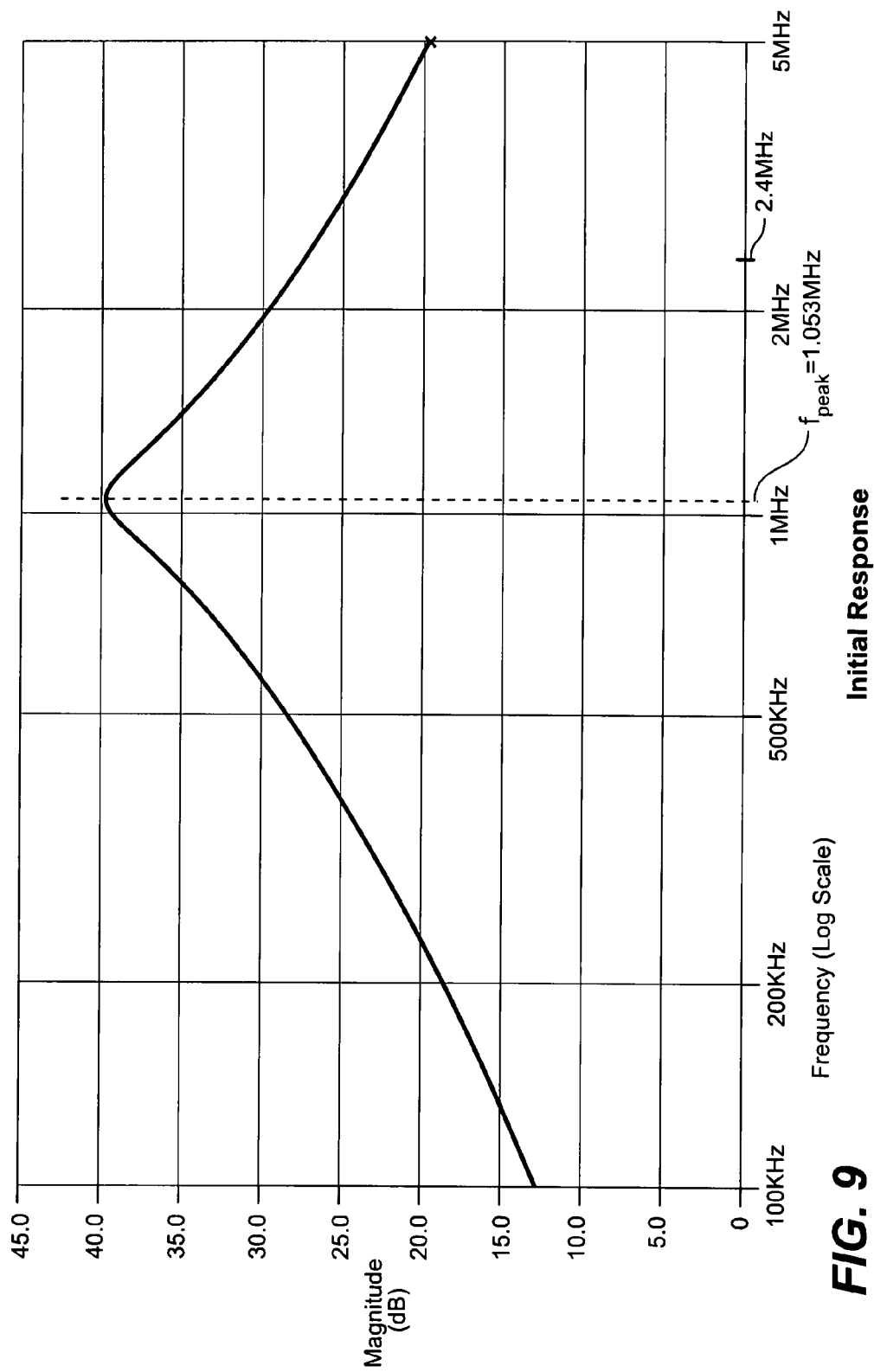
FIGS. 9-11 comprise a sequence of frequency response characteristic curves that illustrate the gain versus frequency response characteristics of an amplifier at different steps of the design process of FIG. 8.

For the particular op amp chosen, FIG. 9 illustrates the resulting simulated response. As shown, the peak frequency occurs at $f_{peak}$=1.053 MHz, which is substantially below the target value of 2.4 MHz. Using Equation 13, $$Cg_{new} = Cg_{current}/(f_{target}/f_{current})^2,$$

obtain a new capacitance value $$Cg_{new} = 1326 \text{ pF}/(2.4/1.053)^2 \cong 255 \text{ pF}$$

Figure 10:
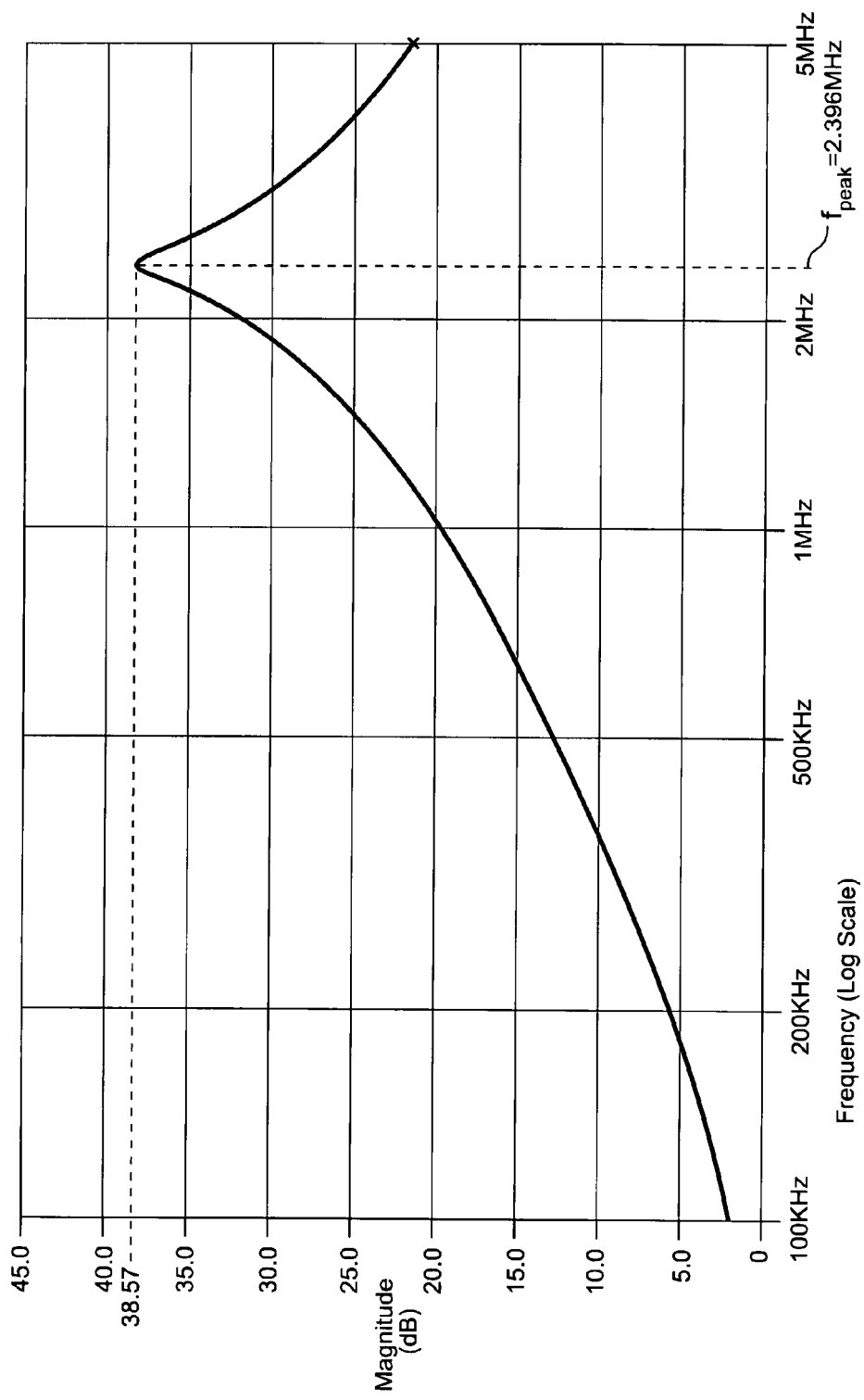

The value of Cg is then decreased to 255 pF, and another simulation is performed. As shown in FIG. 10, assume this moves the peak frequency to $f_{peak}$=2.396 MHz. This is within 1% of the target value, which is sufficiently close so that further iteration may not be necessary. FIG. 10 also shows that the maximum gain at this peak frequency is 38.57 dB, which is lower than the desired gain of 40 dB. Accordingly, the next step is to adjust the value of Rg to move the gain toward the desired gain. Applying Equation 14, $Rg_{new}=Rg_{current}/(Gain_{target}/Gain_{current})$, the new value is $$Rg_{new}=50\Omega/(40/38.570)\approx 48\Omega$$

Figure 11:
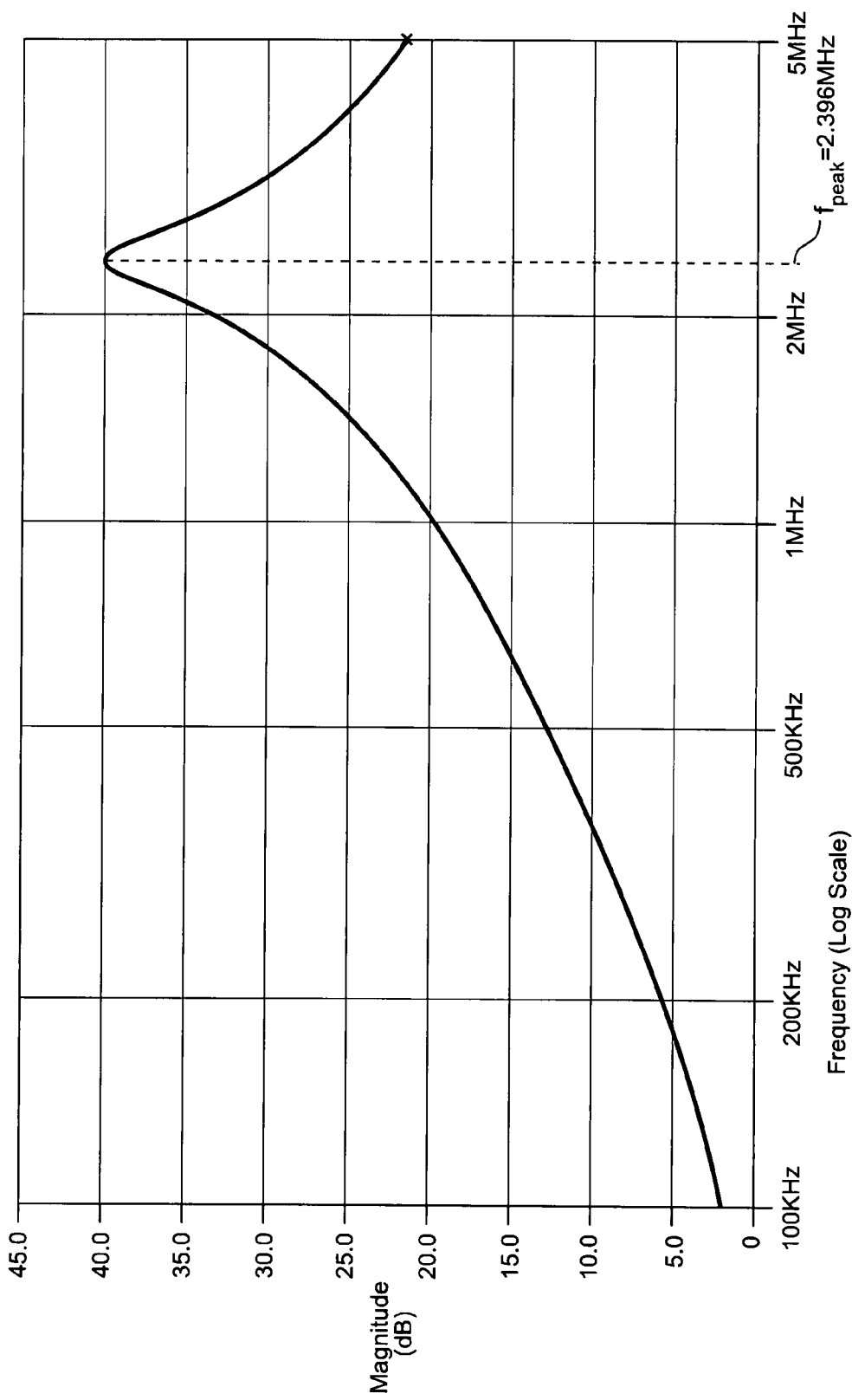

If decreasing the value of Rg by 2Ω to 48Ω results in a peak gain of 38.89 dB, which is 2.8% lower than desired, the value is further adjusted. Since the change in gain from the previous gain of 38.58 was 2/9$^{th}$ of the desired change, the value of Rg may be decreased further to equal 41Ω, and to obtain a new gain of 39.97 dB at the peak frequency of 2.396 MHz, as shown in FIG. 11.

Figure 12:
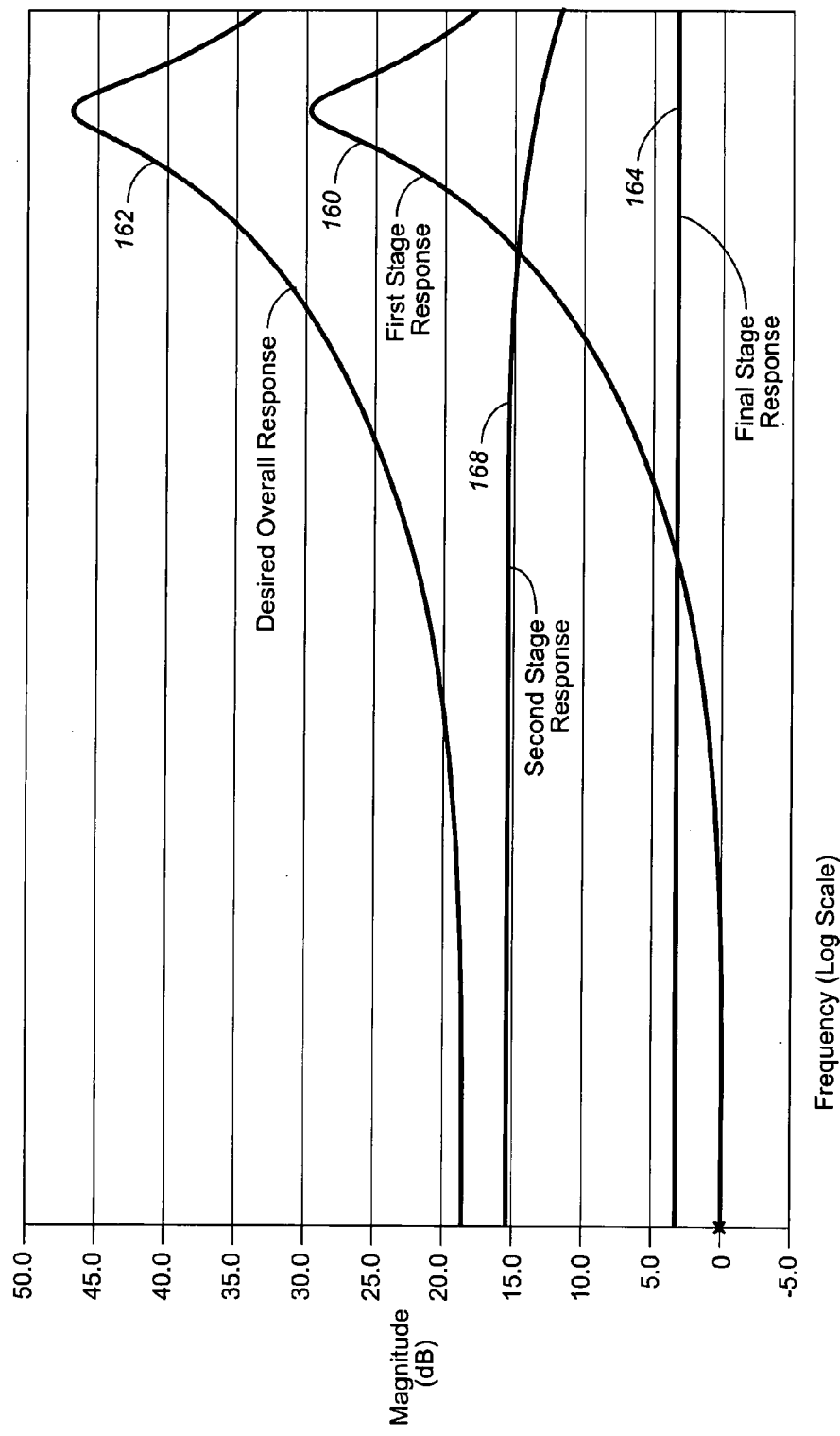
FIG. 12 is a set of frequency response characteristic curves for a three-stage amplifier in accordance with the invention showing how the response characteristics of the three stages combine to provide an overall frequency response.

The foregoing process may be repeated for each subsequent stage of the multi-stage differential warping amplifier, with the target gain-frequency response characteristics of each stage selected to refine and adjust the gain-frequency response characteristic of the overall amplifier to achieve the desired equalization. FIG. 7 illustrated the process for a dual stage warping amplifier. FIG. 12 illustrates the process for a three stage amplifier.

As shown in FIG. 12, assuming that the first stage gain versus frequency response 160 of a three-stage amplifier is as shown in the figure, and that the desired overall gain versus frequency response 162 is as shown in the figure. The first stage response 160 may be subtracted from the desired overall response 162, and the result used to determine the response characteristic 164 for the final stage of the amplifier, as shown. An op amp for the final stage may be selected which has the required drive capability and the necessary gain-bandwidth product to provide the necessary warping response. The foregoing process may be then applied to design the final stage.

In order to achieve the desired overall response, it may be necessary to re-allocate portions of the gain between the stages, and to iterate the design process in order to achieve the overall target response. If two stages are insufficient to provide the desired response and warping curve shape, an intermediate second stage having a response characteristic, as shown at 168 in FIG. 12, may be employed to shape the overall response characteristic to that desired. For instance, if the overall DC gain is too low relative to the peak gain, the intermediate stage may be designed to have a peak gain in the lower part of the frequency spectrum of interest in order to provide a composite gain to match the desired overall gain. Using the foregoing describing the processes, the design of the multi-stage amplifier may be iterated until the desired gain versus frequency response characteristic is obtained.

Figure 13:
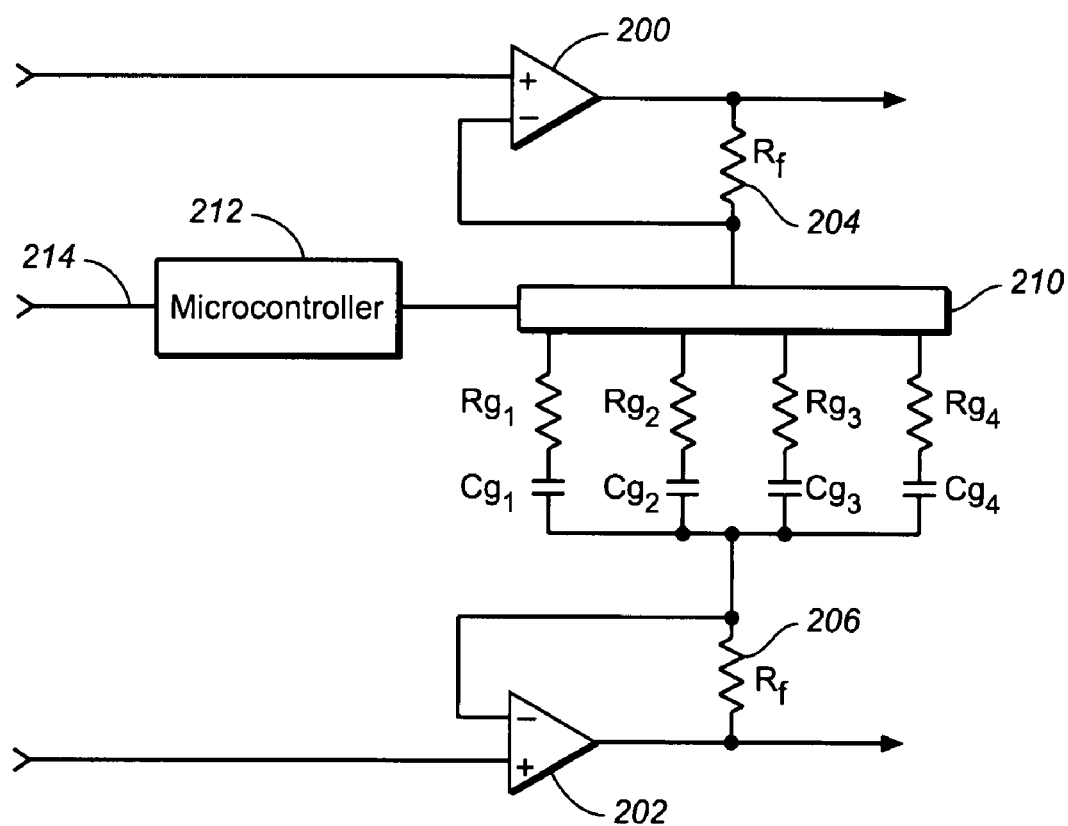
FIG. 13 comprises a schematic diagram of another embodiment of a warping amplifier in accordance with the invention that has an electrically controllable response characteristic.

In some applications, it may be desirable to be able to control the response of the amplifier dynamically. FIG. 13 illustrates another embodiment of a differential warping amplifier stage in accordance with the invention where dynamically varying equalization is afforded. As shown, the differential amplifier stage may comprise a pair of op amps 200, 202 of the same type, and feedback resistors, Rf, 204 and 206 having the same value. In order to provide a varying gain and frequency characteristic, a plurality of series-connected $Rg_i$-$Cg_i$, (i=1–n) networks may be connected together by a multiplexer 210 between the two feedback resistors Rf 204, 206. The multiplexer 210 may be controlled by a microcontroller 212 that receives a control signal on an input 214, and serves as a switch to select one of the series Rg-Cg networks and connect it to the two feedback resistors. By adjusting the values of Rg and Cg to provide different gain and frequency response characteristics, the overall gain versus frequency response characteristic of the amplifier stage may be controllably varied over a range of responses by selecting different R-C combinations using the microcontroller 212. In a multi-stage amplifier, each stage may have a configuration such as shown, and separately controlled to afford a large number of possible overall responses.

While the foregoing has been with respect to preferred embodiments of the invention, it will be appreciated by those skilled in the art that changes in these embodiments may be made without departing from the principles and the spirit of the invention, the scope of which is defined by the appended claims.

The invention claimed is:

1. A method of forming an amplifier to compensate for frequency-dependent attenuation of a transmission line, the amplifier having a first pair of operational amplifiers of a pre-selected type connected as a differential amplifier, and with resistive and capacitive components that determine a gain-frequency characteristic of the differential amplifier over a predetermined frequency spectrum, the method comprising:
   calculating values for said resistive and capacitive components for a predetermined gain at a target peak frequency;
   simulating a first frequency response characteristic of the differential amplifier using a simulation model that is specific for the pre-selected type of operational amplifier and the calculated resistive and capacitive component values;
   determining a difference between a peak frequency obtained in the simulated first frequency response characteristic and the target peak frequency;
   adjusting the capacitive component value by applying an inverse square law relating a ratio of a new capacitance value to a current capacitance value, and relating the square of a ratio of a current frequency to the target peak frequency to determine said new capacitance value for said target peak frequency to move said peak frequency obtained in the simulated first frequency response characteristic toward said target peak frequency; and
   repeating said simulating, determining and adjusting steps until the simulated peak frequency corresponds substantially to said target peak frequency.

2. A warping amplifier for compensating a transmission line over a predetermined frequency spectrum, comprising:
   a first pair of first operational amplifiers connected to form a first differential amplifier for receiving a differential signal from the transmission line;
   a first common frequency response determining network connecting the first operational amplifiers, the first common frequency response determining network comprising first circuit components selected such that together in combination with the internal characteristics of the first operational amplifiers the first circuit components provide a first predetermined gain-frequency response characteristic over said predetermined frequency spectrum to said first differential amplifier;
   a second pair of second operational amplifiers connected to form a second differential amplifier for receiving a differential signal from the first operational amplifiers;
   a second common frequency determining network connecting the second operational amplifiers, the second common frequency determining network comprising second circuit components selected such that together in combination with the internal characteristics of the second operational amplifiers the second circuit components provide a second predetermined gain-frequency response characteristic over said predetermined frequency spectrum to said second differential amplifier; and wherein at least one of the first and second predetermined gain-frequency responses is a bandpass gain-frequency response, and wherein the first and second predetermined gain-frequency responses combine to provide an overall predetermined gain-frequency response over said predetermined frequency spectrum, wherein the overall predetermined gain-frequency response has a maximum value at a target frequency, wherein the overall predetermined gain-frequency response is less than the maximum value for frequencies greater and less than the target frequency.

3. A method of compensating a transmission line over a predetermined frequency spectrum, comprising:

differentially amplifying a differential signal received from said transmission line received in a first differential amplifier comprising first operational amplifiers connected to form said first differential amplifier and connected together by a first frequency response determining network comprising first components selected such that together with the internal characteristics of the first operational amplifiers the first components provide a first predetermined gain-frequency characteristic to the first differential amplifier; and further differentially amplifying the amplified signals from the first differential amplifier in a second differential amplifier comprising second operational amplifiers connected to form said second differential amplifier and connected together by a second frequency response determining network comprising second components selected such that together with the internal characteristics of the second operational amplifiers the second components provide a second predetermined gain-frequency characteristic wherein at least one of the first and second predetermined gain-frequency characteristics is a bandpass gain-frequency response, such that the second predetermined gain-frequency characteristic when combined with said first predetermined gain-frequency characteristic provides an overall predetermined gain-frequency characteristic over said predetermined frequency spectrum, wherein the overall predetermined gain-frequency characteristic has a maximum value at a target frequency, wherein the overall predetermined gain-frequency characteristic is less than the maximum value for frequencies greater and less than the target frequency.

4. The warping amplifier of claim 2 wherein said first circuit components are selected using a simulation model that is specific to the first operational amplifiers such that the first predetermined gain-frequency response characteristic substantially matches the shape of the inverse of the an attenuation-frequency response characteristic of the transmission line, and the second circuit components are selected using another simulation model that is specific to the second operational amplifiers to complement the shape of the first gain-frequency response characteristic and to adjust the overall gain to provide said overall predetermined gain-frequency response.

5. The warping amplifier of claim 4, wherein said overall gain-frequency response characteristic has an increasing gain with frequency such that a second derivative of said characteristic is positive up to a maximum frequency and said overall gain-frequency response characteristic has a concave shape within said predetermined frequency spectrum.

6. The warping amplifier of claim 4, wherein said overall gain-frequency response compensates for the attenuation-frequency characteristic of said transmission line such that the transmission line has a substantially flat frequency response characteristic over said predetermined frequency spectrum.

7. The warping amplifier of claim 2, wherein said target frequency comprises a frequency at which the first differential amplifier has a peak gain, and said first circuit components comprise a resistor and a capacitor connected as an R-C circuit between second inputs of said first operational amplifiers, said target frequency being controlled by values of said resistor and capacitor.

8. The warping amplifier of claim 7, wherein said peak gain is determined by the value of said resistor and by a value of other resistors connected to said operational amplifiers and to said R-C circuit.

9. The warping amplifier of claim 2, wherein said circuit components of one or both of said first and second frequency determining networks comprise a plurality of R-C circuits connected to a switch, and a controller controlling the switch for selection of various ones of said R-C circuits for connection to the operational amplifiers of a respective differential amplifier to control the gain-frequency response characteristic of said respective differential amplifier.

10. The warping amplifier of claim 2 further comprising a third differential amplifier comprising a third pair of operational amplifiers receiving a differential signal from said second differential amplifier, and having third circuit components selected to provide a third gain-frequency response characteristic over said frequency spectrum, the third pair of operational amplifiers being selected to provide a predetermined drive to the transmission line.

11. The warping amplifier of claim 2, wherein said warping amplifier is formed to be located at an intermediate location in said transmission line, and said overall gain-frequency response post-compensates an input segment of the transmission line and pre-compensates an output segment of the line.

12. The warping amplifier of claim 2, wherein said first operational amplifiers of the first pair comprise voltage feedback operational amplifiers that have a high gain bandwidth product and provide high warping and low drive, and said second operational amplifiers of the second pair comprise current feedback operational amplifiers that have a lower gain and a higher drive than the operational amplifiers of the first pair.

13. The warping amplifier of claim 2, wherein said first and second differential amplifiers each comprise an integrated circuit chip.

14. The method of claim 3 further comprising shaping said first gain-frequency characteristic using a simulation model that is specific to the first operational amplifiers to substantially correspond to said an inverse of said an attenuation-frequency characteristic of said transmission line, and shaping said second gain-frequency characteristic using another simulation model that is specific to the second operational amplifiers such that said combined overall gain-frequency characteristic substantially matches said inverse of said attenuation-frequency characteristic.

15. The method of claim 14, wherein said shaping said second gain-frequency characteristic comprises shaping the second gain-frequency characteristic such that the overall gain-frequency characteristic has a concave shape that increases with frequency to a maximum frequency and compensates the transmission line over said predetermined frequency spectrum.

16. The method of claim 15, wherein said maximum frequency is lower than a target frequency at which said first gain-frequency characteristic provides a gain that substantially corresponds to the transmission line attenuation at the target frequency, and a second derivative of the overall gain-frequency characteristic is positive up to said maximum frequency.

17. The method of claim 16, wherein said differentially amplifying comprises amplifying with a gain that increases non-linearly with frequency to a peak gain at said target frequency such that said first gain-frequency characteristic has a concave shape that substantially matches a shape of said inverse attenuation-frequency characteristic.

18. The method of claim 16, wherein said providing a gain at said target frequency comprising compensating for the attenuation of a predetermined length of the transmission line at said target frequency.

19. The method of claim 3, wherein said first and second frequency response determining networks each comprise resistive and capacitive circuit components.

20. The method of claim 1, further comprising adjusting said resistive component value;
using an inverse linear law that relates a ratio of a new resistive component value to a current resistive component value, and to another ratio of a simulated peak gain to the target peak gain;
simulating another response characteristic using said simulation model; determining a difference between the simulated peak gain and the target peak gain, and repeating the resistive component adjusting, simulating and determining steps until the simulated peak gain substantially matches the target peak gain.

21. The warping amplifier of claim 2, wherein the first operational amplifiers are characterized by the absence of a ground reference for the differential signal received from the transmission line.

22. The warping amplifier of claim 2, wherein said overall predetermined gain corresponds to the attenuation of the transmission line at said target frequency, and said overall predetermined gain-frequency response compensates for the attenuation of the transmission line over said predetermined frequency spectrum.

23. The warping amplifier of claim 2, wherein said differential signal from the transmission line is received by the first differential amplifier on first inputs of the first operational amplifiers, and the first frequency response determining network connects to second inputs of the first operational amplifiers.

24. The method of claim 3, wherein said first and second frequency response determining networks are respectively connected between inverting inputs of the first operational amplifiers and between inverting inputs of the second operational amplifiers.

25. The method of claim 24, wherein said first differential amplifier receives said differential signal from the transmission line on non-inverting inputs of the first operational amplifiers and outputs a warped differential signal to non-inverting inputs of the second differential amplifier.

* * * * *